(12) United States Patent
Fallis

(10) Patent No.: US 10,932,503 B2
(45) Date of Patent: Mar. 2, 2021

(54) URINE POWERED GARMENT SYSTEM

(71) Applicant: Martha Fallis, Clearwater, FL (US)

(72) Inventor: Martha Fallis, Clearwater, FL (US)

(*) Notice: Subject to any disclaimer, the term of this patent is extended or adjusted under 35 U.S.C. 154(b) by 43 days.

(21) Appl. No.: 16/511,480

(22) Filed: Jul. 15, 2019

(65) Prior Publication Data
US 2019/0335821 A1 Nov. 7, 2019

Related U.S. Application Data

(63) Continuation-in-part of application No. 14/919,677, filed on Oct. 21, 2015, now abandoned.

(51) Int. Cl.
| | | |
|---|---|---|
| A41D 1/00 | (2018.01) |
| H02S 40/38 | (2014.01) |
| H02S 99/00 | (2014.01) |
| F21V 23/02 | (2006.01) |
| H02J 7/02 | (2016.01) |
| F21V 33/00 | (2006.01) |
| H02J 7/00 | (2006.01) |
| F21Y 115/20 | (2016.01) |

(52) U.S. Cl.
CPC ............... A41D 1/002 (2013.01); F21V 23/02 (2013.01); F21V 33/0008 (2013.01); H02J 7/00 (2013.01); H02J 7/022 (2013.01); H02S 40/38 (2014.12); H02S 99/00 (2013.01); F21Y 2115/20 (2016.08)

(58) Field of Classification Search
CPC .......... A41D 1/002; F21L 13/00; F21L 13/02; F21V 23/02; F21V 33/0008; H02J 7/02; H02J 7/025; H02S 40/38

USPC ................................................. 362/103, 108
See application file for complete search history.

(56) References Cited

U.S. PATENT DOCUMENTS 3,353,539 A * 11/1967 Preston ............... A61F 2/00
                                                                 607/2
2017/0214076 A1* 7/2017 Dhawan .............. H02J 1/00

FOREIGN PATENT DOCUMENTS

FR        2477881-1    *  9/1981  ............. A61G 9/006

OTHER PUBLICATIONS

Machine translation of FR 2477881 (Year: 1981).*
Urquhart, James, Wearable microbial power plants generate electricity from urine, Dec. 11, 2015, NewScientist, https://institutions.newscientist.com/article/dn28655-wearable-microbial-power-plants-generate-electricity-from-urine/ (Year: 2015).*

(Continued)

Primary Examiner — Leah Simone Macchiarolo

(57) ABSTRACT

A urine powered garment has a shirt and trousers. A collector positioned beneath the trousers is adapted to collect urine. A container is located below and coupled to the collector. A converter dis-associates the constituent elements of the urine within the container to create electrical energy. A pouch receives urine from the container. The pouch has a top opening above and a drain tube below. The drain tube couples the pouch and the converter. A source of potential is adapted to receive electrical potential and to store the received electrical potential until accessed. A super-capacitor couples the converter and the source of potential. The super-capacitor converts the output of the converter prior to feeding to the source of potential.

12 Claims, 6 Drawing Sheets

(56) References Cited

OTHER PUBLICATIONS

Taghavi et al., "Self sufficient wireless transmitter powered by foot-pumped urine operating wearable MFC", Dec. 10, 2015, Bioinspiration & Biomimetics, https://iopscience.iop.org/article/10.1088/1748-3190/11/1/016001/pdf (Year: 2015).*

"Powered by Pee: Using Urine in a Microbial Fuel Cell", accessed Oct. 21, 2020, initially published Aug. 5, 2017 per wayback machine, Science Buddies, https://www.sciencebuddies.org/science-fair-projects/project-ideas/EnvSci_p061/environmental-science/microbial-fuel-cell-urine (Year: 2017).*

Savenije, Davide, "5 ways you can use the human body to generate electricity", Jun. 30, 2014, Utility Dive, https://www.utilitydive.com/news/5-ways-you-can-use-the-human-body-to-generate-electricity/280709/ (Year: 2014).*

* cited by examiner

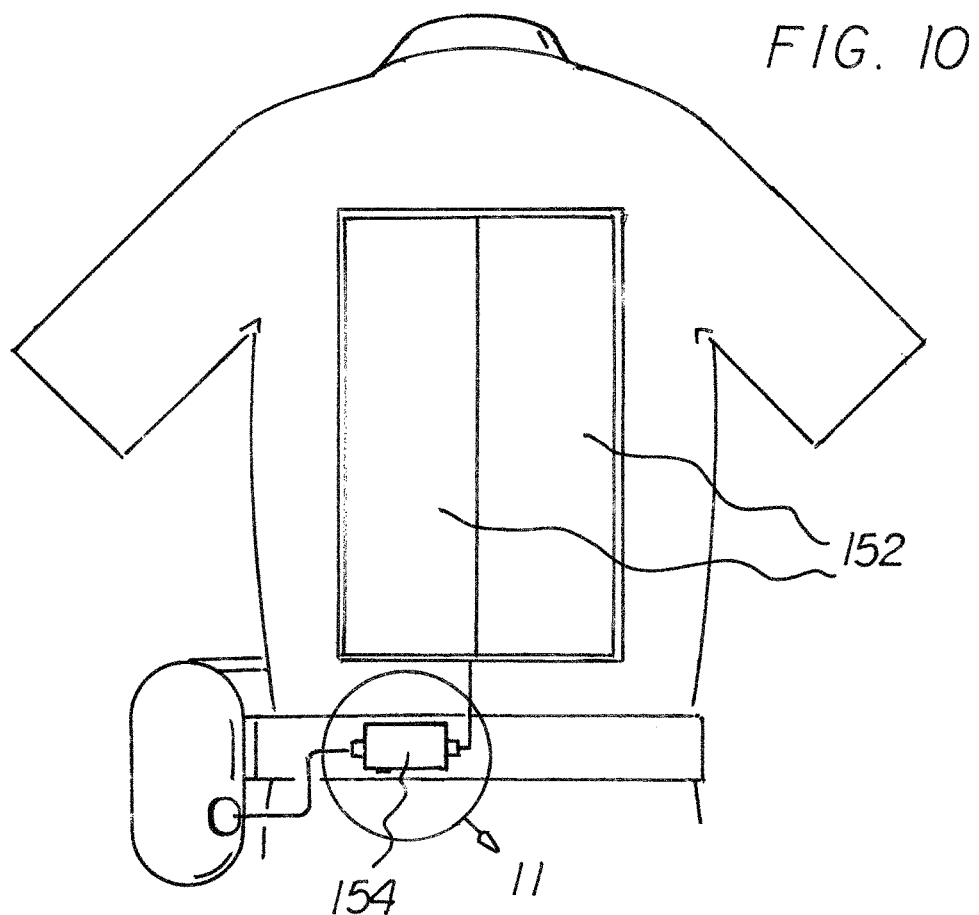
FIG. 10
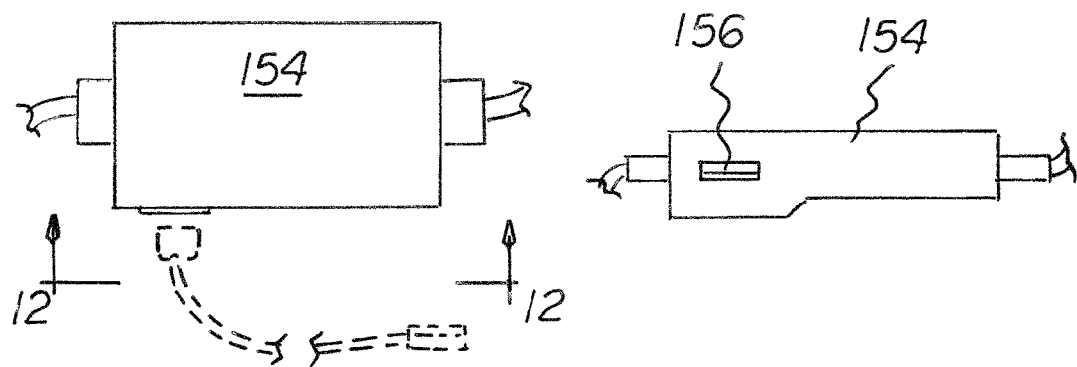
FIG. 11
FIG. 12

URINE POWERED GARMENT SYSTEM

RELATED APPLICATION

The present application is a continuation-in-part of application Ser. No. 14/919,677 filed Oct. 21, 2015 entitled "Urine Powered Garment System," the priority of which is claimed and the subject matter of which is incorporated herein by reference.

BACKGROUND OF THE INVENTION

Field of the Invention

The present invention relates to a urine powered garment system and more particularly pertains to collecting urine from a wearer of the garment, converting the collected urine to electrical power, powering a garment, and illuminating the garment from converted electrical power, the collecting and converting and powering and illuminating being done in a safe, convenient, and economical manner.

SUMMARY OF THE INVENTION

In view of the foregoing disadvantages inherent in the known types of garment systems of known designs and configurations now present in the prior art, the present invention provides an improved urine powered garment system. As such, the general purpose of the present invention, which will be described subsequently in greater detail, is to provide a new and improved urine powered garment system and method which has all the advantages of the prior art and none of the disadvantages.

To attain this, the present invention essentially comprises a urine powered garment system having a shirt and trousers. A collector positioned beneath the trousers is adapted to collect urine. A container is located below and coupled to the collector. A converter dis-associates the constituent elements of the urine within the container to create electrical energy. A pouch receives urine from the container. The pouch has a top opening above and a drain tube below. The drain tube couples the pouch and the converter. A source of potential is adapted to receive electrical potential and to store the received electrical potential until accessed. A super-capacitor couples the converter and the source of potential. The super-capacitor converts the output of the converter prior to feeding to the source of potential.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims attached.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved urine powered garment system which has all of the advantages of the prior art garment systems of known designs and configurations and none of the disadvantages.

It is another object of the present invention to provide a new and improved urine powered garment system which may be easily and efficiently manufactured and marketed.

It is a further object of the present invention to provide a new and improved urine powered garment system which is of durable and reliable constructions.

An even further object of the present invention is to provide a new and improved urine powered garment system which is susceptible of a low cost of manufacture with regard to both materials and labor, and which accordingly is then susceptible of low prices of sale to the consuming public, thereby making such urine powered garment system economically available to the buying public.

Lastly, another object of the present invention is to provide a urine powered garment system for collecting urine from a wearer of the garment, converting the collected urine to electrical power, powering a garment, and illuminating the garment from converted electrical power, the collecting and converting and powering and illuminating being done in a safe, convenient, and economical manner.

These together with other objects of the invention, along with the various features of novelty which characterize the invention, are pointed out with particularity in the claims annexed to and forming a part of this disclosure.

For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 10 is a front elevational view of a shirt with an electro-luminescent panel and with an AC to DC converter powered by the converter.

FIG. 11 is an enlarged illustration taken at circle 11 of FIG. 10.

FIG. 12 is a bottom view of the AC to DC converter showing the USB port.

The same reference numerals refer to the same parts throughout the various Figures.

DESCRIPTION OF THE PREFERRED EMBODIMENT

Figure 1:
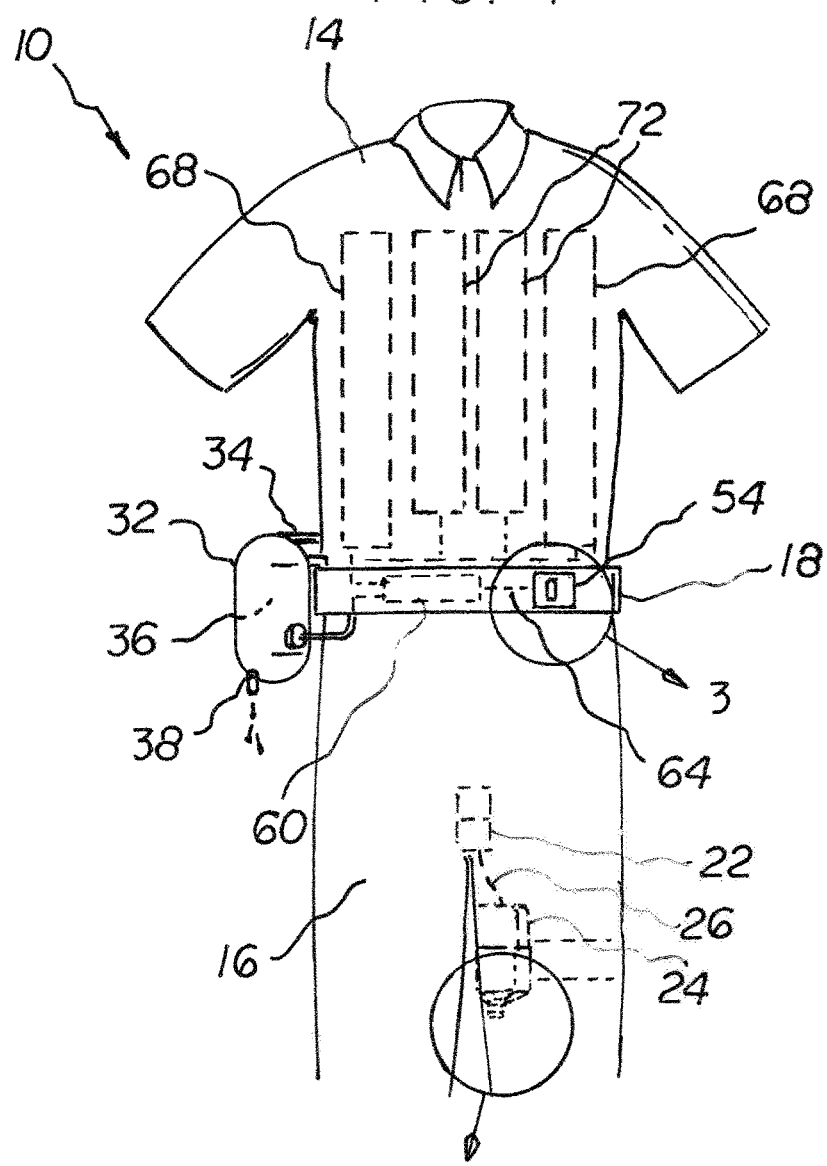
FIG. 1 is a front elevational view of a urine powered garment system constructed in accordance with the principles of the present invention.
Figure 2:
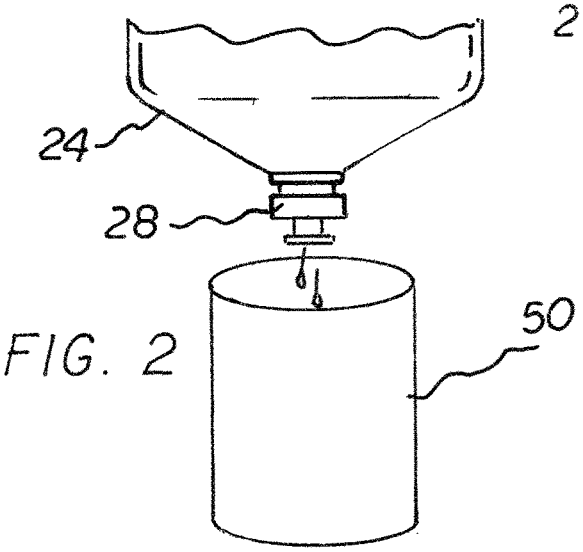
FIG. 2 is an enlarged front elevational view taken at circle 2 of FIG. 1.
Figure 3:
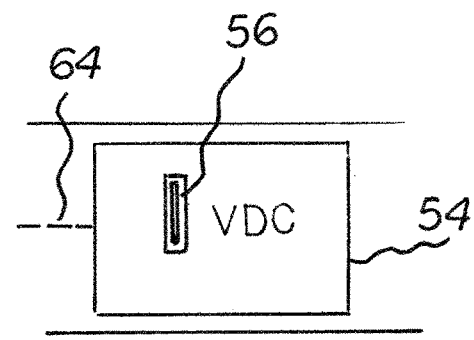
FIG. 3 is an enlarged front elevational view taken at circle 3 of FIG. 1.
Figure 4:
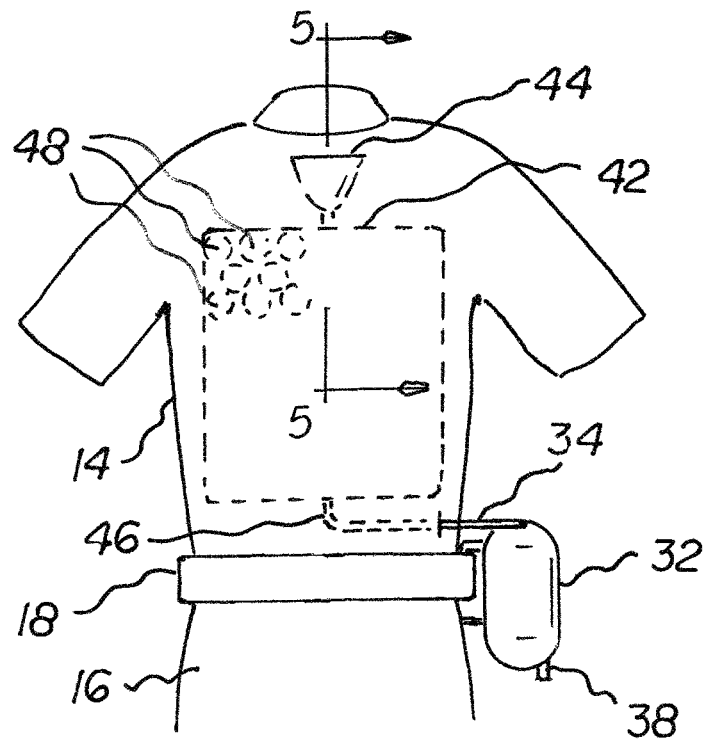
FIG. 4 is a rear elevational view of the urine powered garment system illustrated in FIG. 1.
Figure 5:
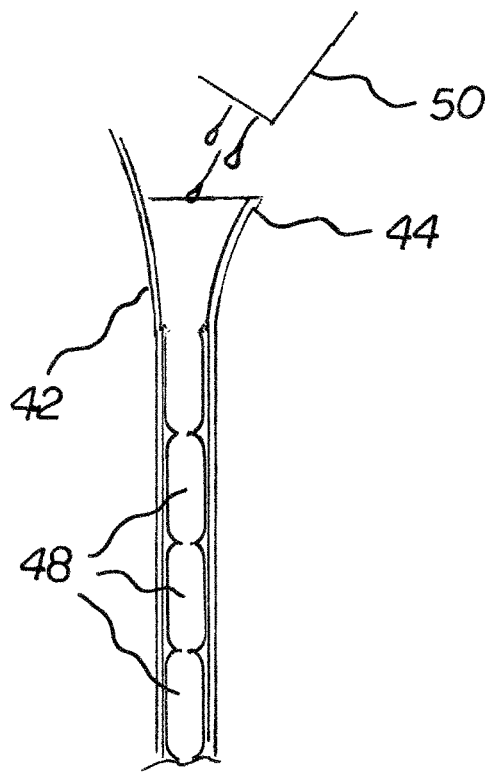
FIG. 5 is a cross sectional view taken along line 5-5 of FIG. 4.

With reference now to the drawings, and in particular to FIG. 1 thereof, the preferred embodiment of the new and improved urine powered garment system embodying the principles and concepts of the present invention and generally designated by the reference numeral 10 will be described.

The present invention, the urine powered garment system 10 is comprised of a plurality of components. Such components in their broadest context include a collector, a container, a pouch, a source of potential, and a super-capacitor. Such components are individually configured and correlated with respect to each other so as to attain the desired objective.

From a specific viewpoint, the primary embodiment of the present invention is a urine powered garment system. A garment is adapted to be worn by a wearer. The garment includes a shirt 14 above. The garment includes trousers 16 below. The garment further includes a belt 18 located between the shirt and the trousers.

A collector 22 is provided. The collector is positioned beneath the trousers. The collector is adapted to collect urine from the wearer. A container 24 is provided. The container is positioned beneath the trousers and below the collector. A tube 26 is provided. The tube is positioned intermediate the collector and the container. In this manner urine is transferred from the collector to the container. A push/pull closure 28 is provided. The push/pull closure is provided in the container. In this manner collected urine may be poured out from the container.

A converter 32 is provided next. The converter is removably coupled to the belt. The converter is chosen from the class of converters including fuel cells and micro-biological converters. The converter has an inlet 34. The inlet provides for the receipt of the urine. The converter has interior components 36. The interior components dis-associate the constituent elements of the urine. In this manner electrical energy is created. The converter has an outlet 38. The outlet provides for the discharge of the dis-associated constituent elements from the urine from the converter.

A pouch 42 is provided. The pouch is positioned within the shirt adjacent to a back of the wearer. The pouch includes a funnel 44. The funnel is positioned above. The funnel provides for the receipt of urine from the container. The pouch has a drain tube 46. The drain tube is positioned below. The drain tube couples the pouch and the converter. The pouch has intermediate chambers 48. The intermediate chambers provide a flow rate at the drain tube less than the flow rate at the funnel. A bucket 50 is provided. The bucket provides for the transference of urine from the container to the pouch.

Also provided is a source of potential 54. The source of potential has a user-accessible outlet port 56. The source of potential is adapted to receive electrical potential. The source of potential is further adapted to store the received electrical potential until accessed through the outlet port.

A super-capacitor 60 is provided next. The super-capacitor couples the converter and the source of potential. The super-capacitor is adapted to convert the output of the converter prior to feeding the source of potential.

Provided next is a super-conductor 64. The super-conductor couples the super-capacitor and the source of potential.

Further provided is a plurality of solar panels 68. The solar panels are mounted on the shirt. The solar panels are adapted to receive sunlight. The solar panels are further adapted to convert the received sunlight to electrical potential. The solar panels are operatively coupled to the super-capacitor.

Provided last is plurality of electro-luminescent panels 72. The electro-luminescent panels are mounted on the shirt. The electro-luminescent panels are operatively coupled to the solar panels, to the super capacitor, and to the source of potential. In this manner the electro-luminescent panels are powered and illuminated.

An alternate embodiment of the invention is illustrated in FIGS. 6 through 9. In this embodiment, the urine powered garment system 100 includes a flexible tube 104. The flexible tube has a lower end coupled to the converter. The flexible tube has an upper end coupled to the top opening of the pouch.

In this alternate embodiment, a squeeze bulb pump 106 is provided. The squeeze bulb pump is in communication with the flexible tube adjacent to the converter. In this manner a closed fluid flow path is established from the converter, through the flexible tube, and to the top of the pouch. Repeated squeezing and releasing of the squeeze ball pump will cause a flow of urine from the converter to the top opening of the pouch.

Next in this embodiment, at least one one-way valve 108 is provided. The one-way valve is located within the length of the tube. The one-way valve abates reverse flow of urine within the flexible tube.

Figure 6:
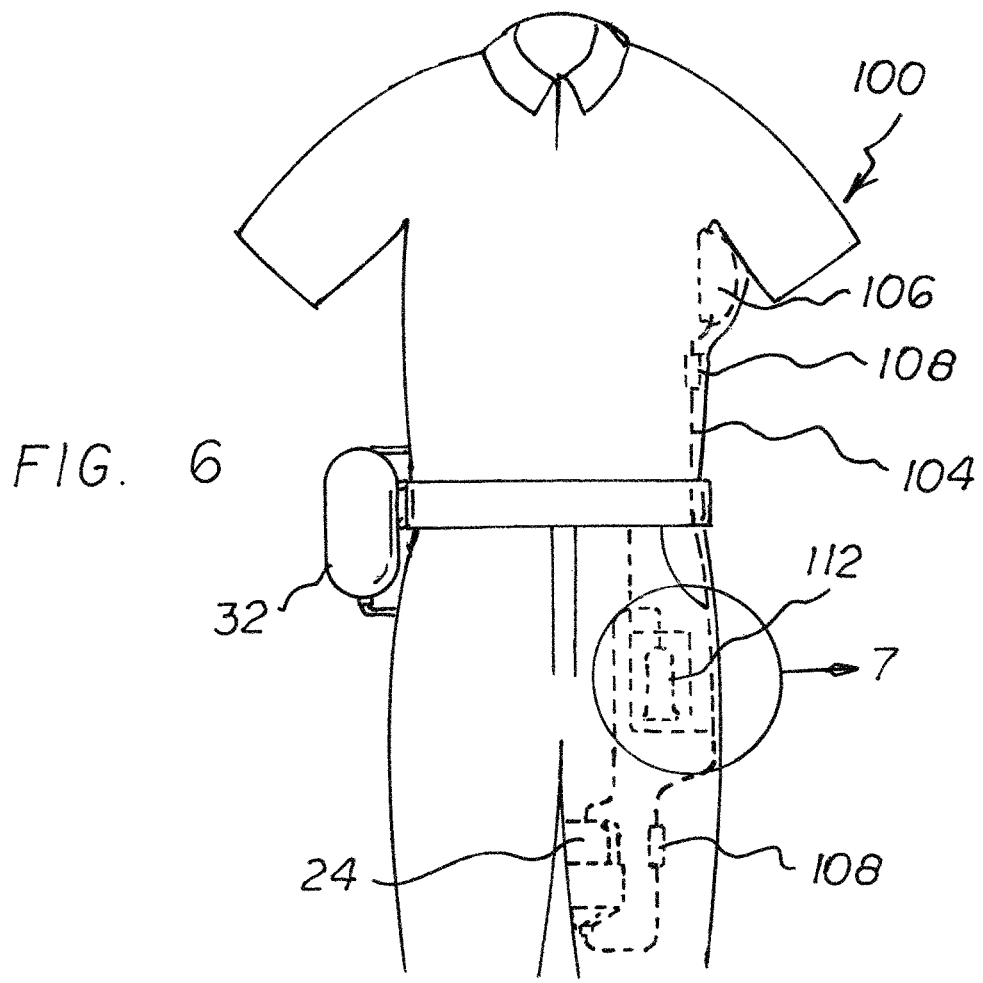
FIG. 6 is a front elevational view of a urine powered garment system constructed in accordance with an alternate embodiment of the present invention.
Figure 7:
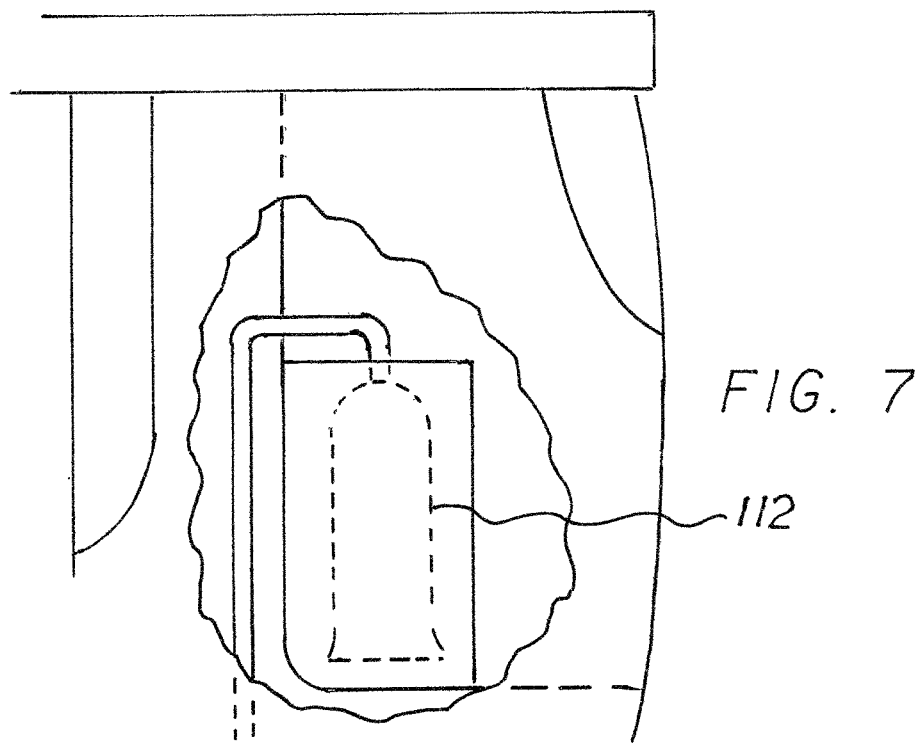
FIG. 7 is an enlarged front elevational view taken at circle 7 of FIG. 6.

In still another embodiment, as shown in FIGS. 6 and 7, the collector 112 may be configured for use by a male.

Figure 8:
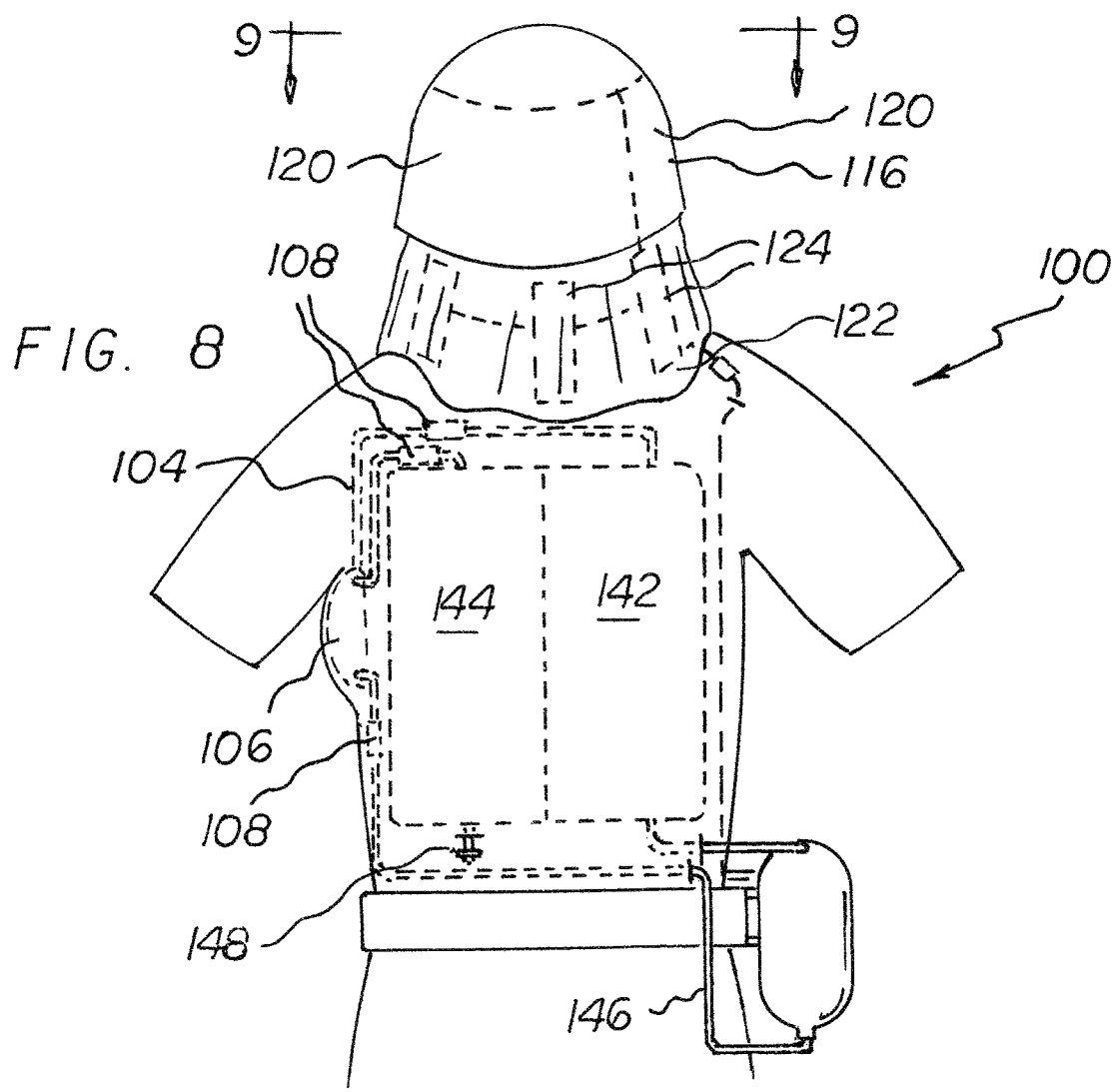
FIG. 8 is a rear elevational view of the system illustrated in FIG. 6.
Figure 9:
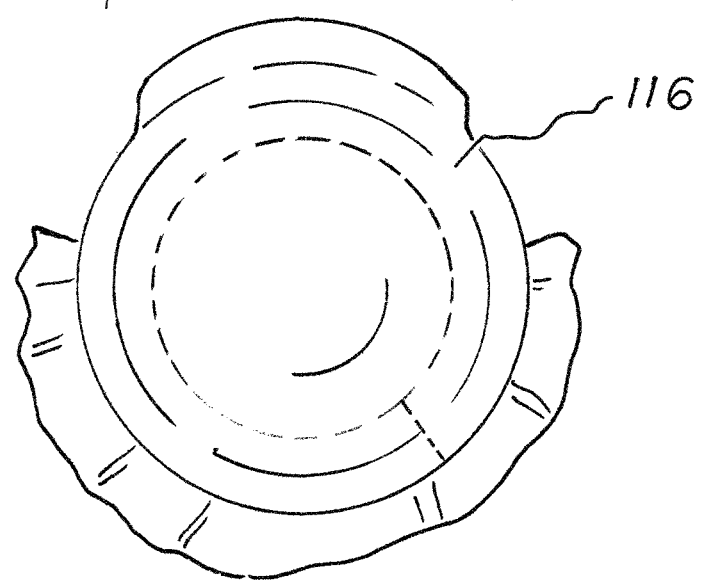
FIG. 9 is a plan view taken of the system along line 9-9 of FIG. 8.
Figure 13:
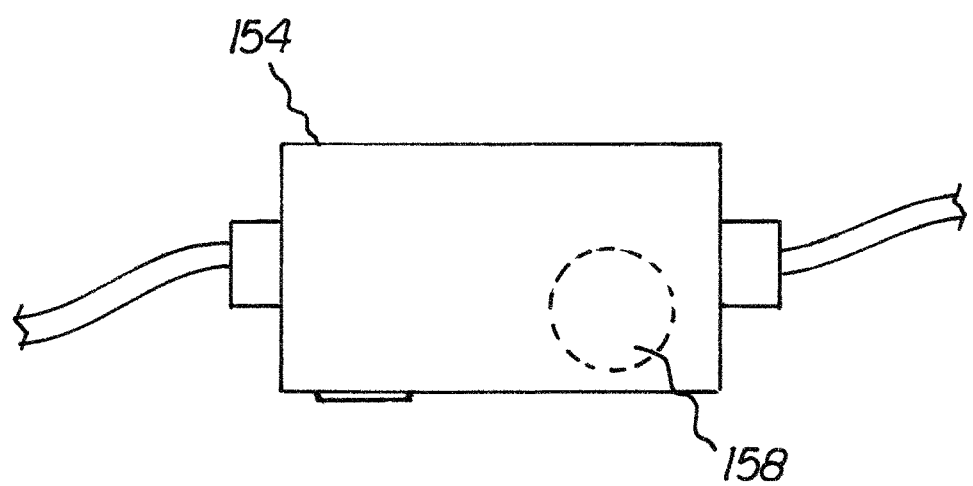
FIG. 13 is an illustration showing the button-cell battery.

In another embodiment, as shown in FIGS. 8 and 9, the system includes a hat 116 with a plurality of supplemental solar panels 120. The supplemental solar panels are operatively coupled to the super-capacitor. The supplemental solar panels are adapted to convert sunlight into electrical potential. The hat is in the form of a helmet. The hat has a depending neck covering 122 including electro-luminescent panels 124 for illumination purposes.

In another embodiment, a primary pouch 142 and a secondary pouch 144 are provided. A feed line 146 is also provided. The feed line feeds urine from the converter to the primary pouch and the secondary pouch. The primary pouch is formed of cells for gravity feeding urine to the converter. A valve 148 is provided at a lower location. The secondary pouch is formed to gravity feed urine to the valve. In this manner urine in the secondary pouch is adapted to be emptied periodically for processing.

In another embodiment, at least one enlarged electro-luminescent panel 152 is provided on the back of the shirt. An AC to DC converter 154 is located intermediate the converter. At least one enlarged electro-luminescent panel is provided. Also provided is at least one USB port 156 in the AC to DC converter for charging devices and for recharging purposes.

In still another embodiment, a button-cell battery 158 is provided for charging devices and for recharging purposes.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A urine powered garment including a shirt and trousers;
   a collector positioned beneath the trousers adapted to collect urine;
   a container coupled to the collector, the container being located below the collector;
   a converter for dis-associating the constituent elements of the urine within the container to create electrical energy;
   a pouch for receiving urine from the container, the pouch having a top opening above and a drain tube below coupling the pouch and the converter;
   a source of potential adapted to receive electrical potential and store the received electrical potential until accessed; and
   a super-capacitor coupling the converter and the source of potential, the super capacitor adapted to convert the output of the converter prior to feeding to the source of potential.

2. The system as set forth in claim 1 and further including:
   a bucket for transferring urine from the container to the pouch.

3. The system as set forth in claim 1 and further including:
   a plurality of solar panels mounted on the shirt, the solar panels adapted to receive sunlight and convert the received sunlight to electrical potential, the solar panels operatively coupled to the super-capacitor.

4. The system as set forth in claim 3 and further including:
   a plurality of electro-luminescent panels mounted on the shirt, the plurality of electro-luminescent panels operatively coupled to the solar panels and to the super capacitor and to the source of potential for powering and illuminating the electro-luminescent panels.

5. The system as set forth in claim 1 wherein the collector is configured for use by a female.

6. The system (100) as set forth in claim 1 and further including:
   a flexible tube (104) having a lower end coupled to the converter, the flexible tube having an upper end coupled to the top opening of the pouch at the top;
   a squeeze bulb pump (106) in communication with the flexible tube adjacent to the converter to establish a closed fluid flow path from the converter, through the flexible tube, and to the top of the pouch whereby repeated squeezing and releasing of the squeeze ball pump will cause a flow of urine from the converter to the top opening of the pouch; and
   at least one one-way valve (108) located within the length of the tube to abate reverse flow of urine within the flexible tube.

7. The system as set forth in claim 6 wherein the pouch includes a primary pouch (142) and a secondary pouch (144) and a feed line (146) feeding urine from the converter to the primary pouch and the secondary pouch, the primary pouch being formed of cells for gravity feeding urine to the converter, the secondary pouch being formed for gravity feeding urine to a valve (148) at a lower location whereby urine in the secondary pouch is adapted to be emptied periodically for processing.

8. The system as set forth in claim 1 wherein the collector (112) is configured for use by a male.

9. The system as set forth in claim 1 and further including:
   a hat (116), the hat including a plurality of supplemental solar panels (120) operatively coupled to the super capacitor, the supplemental solar panels adapted to convert sunlight into electrical potential, the hat being formed as a helmet with a depending neck covering (122), the depending neck covering including electro-luminescent panels (124) for illumination purposes.

10. The system as set forth in claim 1 and further including at least one enlarged electro-luminescent panel (152) on the back of the shirt, an AC to DC converter (154) intermediate the converter and the at least one enlarged electro-luminescent panel, and a USB port (156) in the AC to DC converter for charging devices and for recharging purposes.

11. The system as set forth in claim 1 and further including a button-cell battery (158) for charging devices and for recharging purposes.

12. A urine powered garment system (10) for collecting urine from a wearer of the garment, converting the collected urine to electrical power, powering a garment, and illuminating the garment from converted electrical power, the collecting and converting and powering and illuminating being done in a safe, convenient, and economical manner, the system comprising, in combination:
   the garment adapted to be worn by a wearer, the garment including a shirt (14) above and trousers (16) below and a belt (18) between the shirt and the trousers;
   a collector (22) positioned beneath the trousers and adapted to collect urine from the wearer, a container (24) positioned beneath the trousers and below the collector, a tube (26) intermediate the collector and the container for transferring urine from the collector to the container, a push/pull closure (28) in the container for pouring out collected urine from the container;
   a converter (32) removably coupled to the belt, the converter chosen from the class of converters including fuel cells and micro-biological converters, the converter having an inlet (34) for receiving urine, the converter having interior components (36) for dis-associating the constituent elements of the urine to create electrical energy, the converter having an outlet (38) to discharge the dis-associated constituent elements from the urine from the converter;
   a pouch (42) within the shirt adjacent to a back of the wearer, the pouch including a funnel (44) above for receiving urine from the container, the pouch having a drain tube (46) below coupling the pouch and the converter, the pouch having intermediate chambers (48) for providing a flow rate at the drain tube less than the flow rate at the funnel, a bucket (50) for transferring urine from the container to the pouch;

a source of potential (54) having a user-accessible outlet port (56), the source of potential adapted to receive electrical potential and store the received electrical potential until accessed through the outlet port;

a super-capacitor (60) coupling the converter and the source of potential, the super-capacitor adapted to convert the output of the converter prior to feeding the source of potential;

a super-conductor (64) coupling the super-capacitor and the source of potential;

a plurality of solar panels (68) mounted on the shirt, the solar panels adapted to receive sunlight and convert the received sunlight to electrical potential, the solar panels operatively coupled to the super-capacitor; and a plurality of electro-luminescent panels (72) mounted on the shirt, the plurality of electro-luminescent panels operatively coupled to the solar panels and to the super-capacitor and to the source of potential for powering and illuminating the electro-luminescent panels.

* * * * *